(12) United States Patent
Ibrahim et al.

(10) Patent No.: US 11,870,516 B2
(45) Date of Patent: Jan. 9, 2024

(54) APPARATUS AND METHODS FOR BETTER ESTIMATION OF RADIATION POWER UTILIZING PAPC COMPENSATION

(71) Applicant: Samsung Electronics Co., Ltd., Suwon-si (KR)

(72) Inventors: Ahmed Atef Ibrahim Ibrahim, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/453,160

(22) Filed: Nov. 1, 2021

(65) Prior Publication Data

US 2023/0031539 A1     Feb. 2, 2023

Related U.S. Application Data

(60) Provisional application No. 63/221,776, filed on Jul. 14, 2021.

(51) Int. Cl.
*H04B 7/0456*     (2017.01)
*H04B 7/06*     (2006.01)
*H04B 7/0495*     (2017.01)

(52) U.S. Cl.
CPC ......... *H04B 7/0456* (2013.01); *H04B 7/0495* (2013.01); *H04B 7/0639* (2013.01)

(58) Field of Classification Search
CPC ......... G01R 21/133; G01R 29/08; G06F 1/28; G06F 1/3296; H04B 1/3827; H04B 7/00;
(Continued)

(56) References Cited

U.S. PATENT DOCUMENTS 10,396,863 B2    8/2019    Li et al.
10,893,488 B2    1/2021    Khawand et al.
(Continued)

FOREIGN PATENT DOCUMENTS

CN    101807979 A    8/2010
EP    3214875 B1    6/2017
(Continued)

OTHER PUBLICATIONS

P.L. Cao et al. "Precoding Design for Massive MIMO Systems with Sub-connected Architecture and Per-antennas Power Constraints" (Year: 2018).*

(Continued)

*Primary Examiner* — Shawkat M Ali

(57) ABSTRACT

A base station includes a plurality of antennas, a data unit (DU) comprising a first processor and a first memory containing instructions, which when executed by the first processor, cause the DU to receive a signal to be transmitted via the plurality of antennas, obtain per-antenna-power-constraint (PAPC) information, determine an estimated effective transmission power ($P_{eff}$) based on the PAPC information, and pre-schedule the signal for transmission based on the $P_{eff}$. The base station further includes a massive MIMO unit (MMU) comprising a second processor and a second memory containing instructions, which when executed by the second processor, cause the MMU to receive, from the DU, the pre-scheduled signal, perform pre-coding on the pre-scheduled signal based on a current value of a PAPC determined at the MMU to normalize per-antenna gain of antennas of the plurality of antennas, and provide the pre-coded signal for transmission via the plurality of antennas.

20 Claims, 7 Drawing Sheets

(58) Field of Classification Search
CPC . H04B 7/04; H04B 7/06; H04B 7/024; H04B 7/0413; H04B 7/0456; H04B 7/0495; H04B 7/0639; H04L 5/00; H04L 5/14; H04L 25/02; H04L 27/26; H04W 8/22; H04W 52/02; H04W 52/14; H04W 52/22; H04W 52/36; H04W 72/04
USPC ........ 370/252, 331, 335, 336; 375/219, 260, 375/262, 267, 295, 316, 346
See application file for complete search history.

(56) References Cited

U.S. PATENT DOCUMENTS

| | | | |
|---|---|---|---|
| 11,064,443 | B1 | 7/2021 | Lin et al. |
| 11,476,903 | B1 * | 10/2022 | Sahin ................ H04L 25/0226 |
| 2013/0051486 | A1 | 2/2013 | Pi |
| 2018/0310244 | A1 | 10/2018 | Wich et al. |
| 2021/0124404 | A1 | 4/2021 | Mohammad et al. |

FOREIGN PATENT DOCUMENTS

| | | |
|---|---|---|
| KR | 20210010199 A | 1/2021 |
| WO | 2018219475 A1 | 12/2018 |

OTHER PUBLICATIONS

S. Zhang et al. "Massive MIMO with Per-antenna Power Constraint" (Year: 2014).*
International Search Report and Written Opinion dated Aug. 31, 2022 regarding International Application No. PCT/KR2022/007734, 6 pages.
Zhang et al., "Joint Resource allocation for Linear Precoding in Downlink Massive MIMO Systems", IEEE Transactions on Communications, vol. 69, No. 5, Jan. 2021, pp. 3039-3053.
Kim et al., "Complete Power Reallocation for MU-MIMO under Per-Antenna Power Constraint", arXiv:2102.06392v1 [cs.IT], Feb. 2021, 11 pages.

* cited by examiner

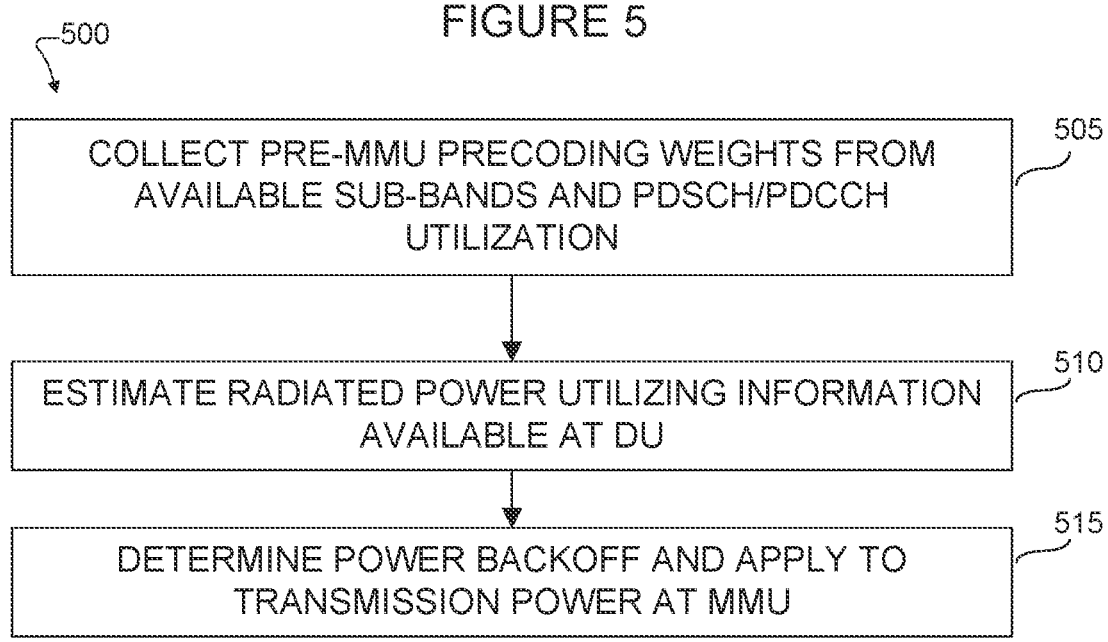

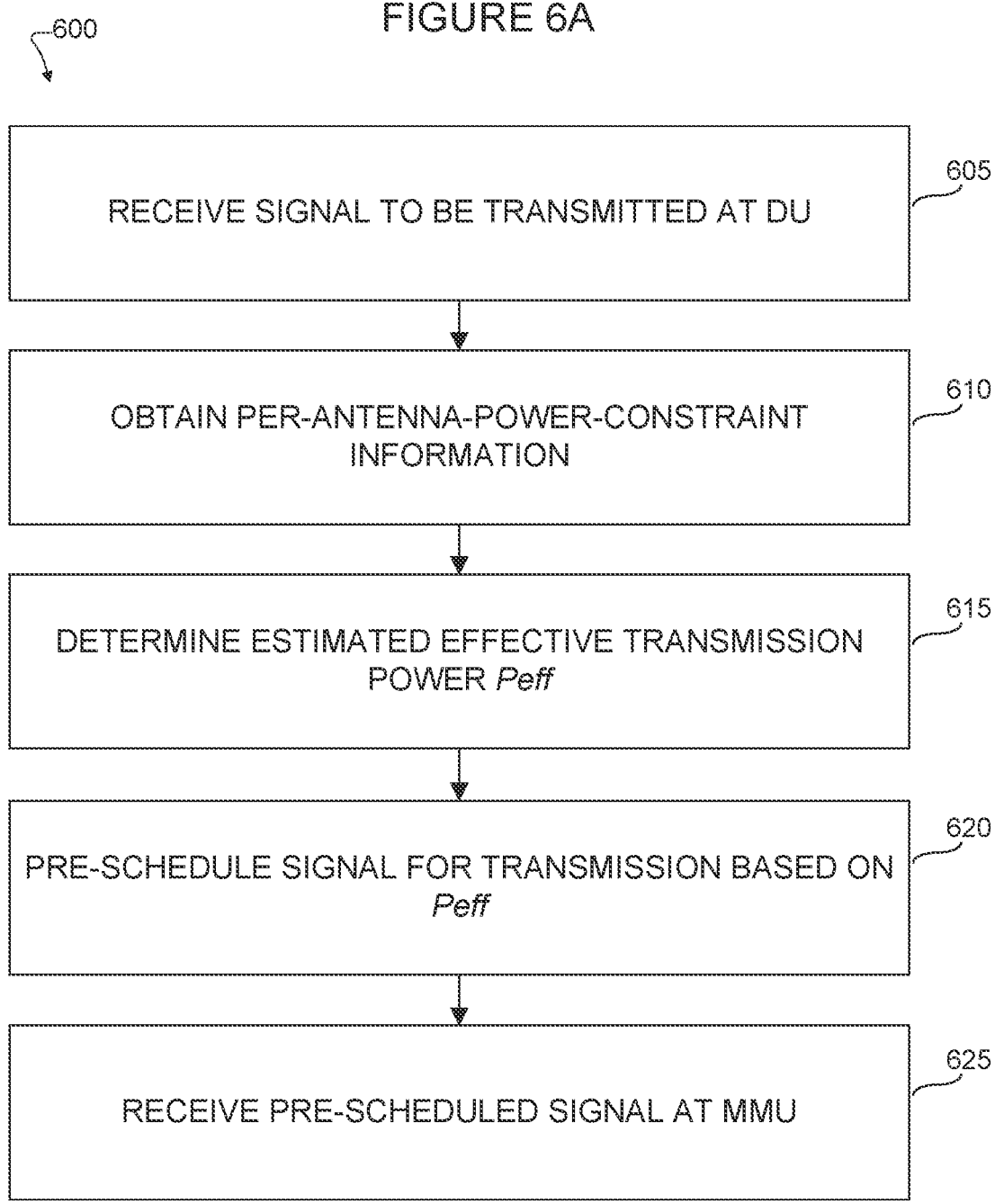

APPARATUS AND METHODS FOR BETTER ESTIMATION OF RADIATION POWER UTILIZING PAPC COMPENSATION

CROSS-REFERENCE TO RELATED APPLICATION AND CLAIM OF PRIORITY

This application claims priority under 35 U.S.C. § 119(e) to U.S. Provisional Patent Application No. 63/221,776 filed on Jul. 14, 2021. The above-identified provisional patent application is hereby incorporated by reference in its entirety.

TECHNICAL FIELD

This disclosure relates generally to wireless communication networks. More specifically, this disclosure relates to methods and apparatus for improved estimation of the radiated power of a base station utilizing a per-antenna power constraint (PAPC).

BACKGROUND

Advances in wireless communication technology and increased adoption of electronic devices with wireless communication functionalities, and increased distribution of network access buildings have raised concerns about human exposure to radio frequency radiation, the long-term effects of which, if any, are not yet fully understood. Because of this, regulations placing limits on the power density a transmitter (for example, a base station or gNB) radiates to locations surrounding the transmitter have been instituted in various jurisdictions in Europe and Asia and are expected to be instituted in North American jurisdictions.

For many modern, high-frequency, multi-antenna transmitters, estimating the received power away from the transmitter presents a multi-layered technical problem. This is due to at least the following issues. First, the transmitted power is not uniform in all directions, as multi-antenna transmitters can create transmission beams which provide antenna gain in some directions. Second, many base stations utilize a two-layered signal processing structure, in which a data unit (DU) adjusts the transmission power of each antenna as part a first layer of pre-transmission signal processing and a massive multi-input multi-output unit (MMU) further adjusts the transmission power of each antenna as part of a second layer of pre-transmission processing. In cases where the received power of the transmitter at a specified distance needs to be below a threshold value, the DU may adjust the power based on a combination of assumptions regarding the maximum gain of the transmitter and the downstream power adjustments performed by MMU. In the absence of a more nuanced approach to estimating the received power of the transmitter, tuning the transmission power at the DU based on assumptions regarding the maximum gain and downstream processing often results in rolling back the power of the transmitter significantly more than is necessary to comply with a received power restriction. In such cases, the transmitter may provide an unnecessarily weak signal, which can translate into inefficiencies (for example, dropped calls and avoidable handoffs) and various types of diminished network performance.

Accordingly, performing DU-level power adjustments which do not roll back the transmission power beyond what is necessary to comply with radiation limits remains a source of technical challenges and opportunities for improvement in the art.

SUMMARY

This disclosure provides methods and apparatus for methods and apparatus for improved estimation of the radiated power of a base station utilizing a per-antenna power constraint (PAPC).

In one embodiment, a base station includes a plurality of antennas, a data unit (DU) comprising a first processor and a first memory containing instructions, which when executed by the first processor, cause the DU to receive a signal to be transmitted via the plurality of antennas, obtain per-antenna-power-constraint (PAPC) information, determine an estimated effective transmission power ($P_{eff}$) based on the PAPC information, and pre-schedule the signal for transmission based on the $P_{eff}$. The base station further includes a massive MIMO unit (MMU) comprising a second processor and a second memory containing instructions, which when executed by the second processor, cause the MMU to receive, from the DU, the pre-scheduled signal, perform pre-coding on the pre-scheduled signal based on a current value of a PAPC determined at the MMU to normalize per-antenna gain of antennas of the plurality of antennas, and provide the pre-coded signal for transmission via the plurality of antennas.

In another embodiment, a method includes at a base station comprising a plurality of antennas, a data unit (DU), and a massive MIMO unit, receiving, by the DU, a signal to be transmitted via the plurality of antennas, obtaining, by the DU, per-antenna-power-constraint (PAPC) information, determining, by the DU, an estimated effective transmission power ($P_{eff}$) based on the PAPC information, pre-scheduling, by the DU, the signal for transmission based on the $P_{eff}$, receiving, by the MMU from the DU, the pre-scheduled signal, performing, by the MMU, pre-coding on the pre-scheduled signal based on a current value of a PAPC determined at the MMU to normalize per-antenna gain of antennas of the plurality of antennas, and providing, by the MMU, the pre-coded signal for transmission via the plurality of antennas.

In another embodiment, a non-transitory computer-readable medium containing instructions, which, when executed by a processor, cause a base station comprising a plurality of antennas, a data unit (DU) and a massive MIMO unit (MMU) to receive, by the DU, a signal to be transmitted via the plurality of antennas, obtain, by the DU, per-antenna-power-constraint (PAPC) information, determine, by the DU, an estimated effective transmission power ($P_{eff}$) based on the PAPC information, pre-schedule, by the DU, the signal for transmission based on the $P_{eff}$, receive, by the MMU from the DU, the pre-scheduled signal, perform, by the MMU, pre-coding on the pre-scheduled signal based on a current value of a PAPC determined at the MMU to normalize per-antenna gain of antennas of the plurality of antennas, and provide, by the MMU, the pre-coded signal for transmission via the plurality of antennas.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates operations of an example method for performing PAPC compensation to reduce power backoff in a transmitter employing a split DU/MMU processing architecture according to various embodiments of this disclosure; and FIGS. 6A and 6B illustrate operations of an example method for estimating the radiated power of a base station utilizing a per-antenna power constraint (PAPC) according to various embodiments of this disclosure.

DETAILED DESCRIPTION

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
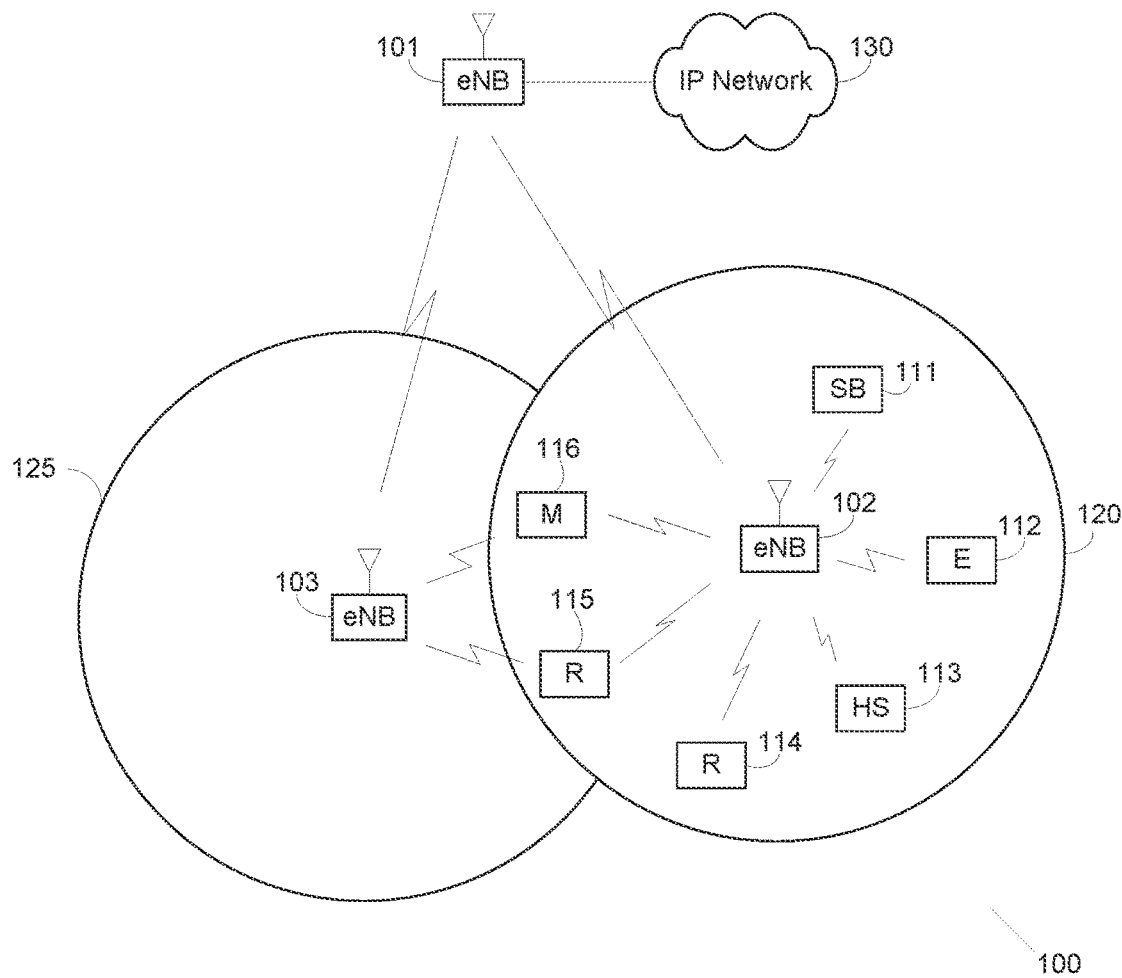
FIG. 1 provides an illustrative example of a wireless network in which PAPC compensation according to certain embodiments of this disclosure may be performed.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, the term 'gNB' can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2:
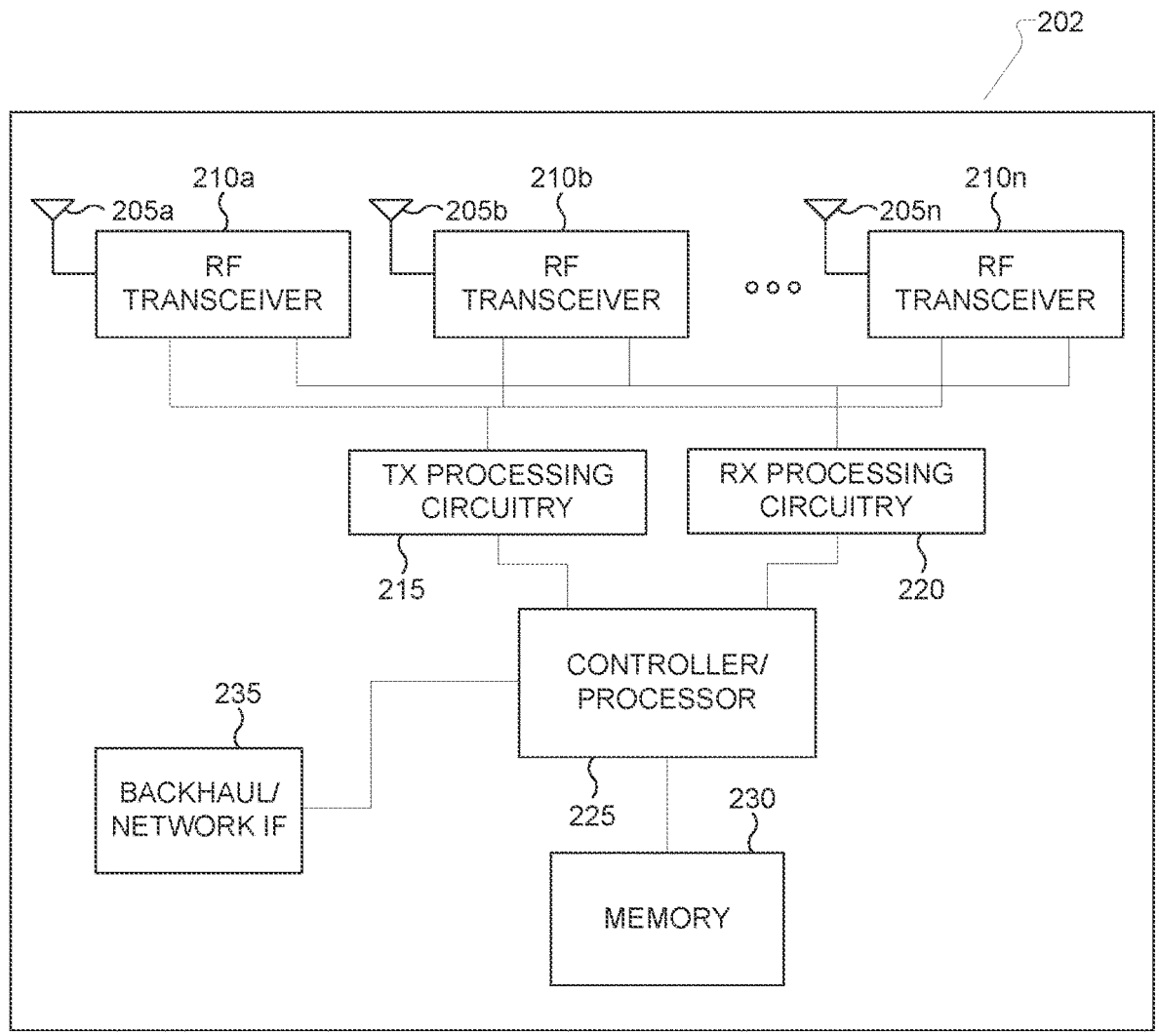
FIG. 2 illustrates an example of a base station in accordance with an embodiment of this disclosure.

FIG. 2 illustrates an example base station 202 according to this disclosure. The embodiment of the base station 102 illustrated in FIG. 2 is for illustration only, and the base stations 101 and 103 of FIG. 1 could have the same or similar configuration. However, base stations come in a wide variety of configurations, and FIG. 2 does not limit the scope of this disclosure to any particular implementation of a base station.

As shown in the explanatory example of FIG. 2, the base station 202 includes multiple antennas 205a-205n, multiple RF transceivers 210a-210n, transmit (TX) processing circuitry 215, and receive (RX) processing circuitry 220. The base station 202 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. According to certain embodiments, TX processing circuitry 215 may modular and may comprise one or more data units (DUs) or massive multi-input/multi-output units (MMUs) for pre-coding and pre-processing multiplexed signals to be transmitted via a plurality of antennas. The RF transceivers 210a-210n receive the outgoing processed baseband or IF signals from the TX processing circuitry 215 and up-converts the baseband or IF signals to RF signals that are transmitted via the antennas 205a-205n. According to certain embodiments, the RF signals transmitted via antennas 205a-205n are encoded such that data to be transmitted, and the associated signaling are apportioned to time/frequency resource blocks ("RBs"). In this illustrative example, base station 202 provides, through antennas 205a-205n wireless signals over a coverage area, and has a number of operational parameters, such as antenna height, electronic and mechanical tilt, by which the coverage area can be tuned. In this way, the base station can, for example, transmit signals satisfying threshold values for received signal strength and received signal quality within a designated coverage area of the base station.

The controller/processor 225 can include one or more processors or other processing devices that control the overall operation of the base station 202. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the base station 202 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the base station 202 to communicate with other devices or systems over a backhaul connection or over a network. The interface 235 could support communications over any suitable wired or wireless connection(s). For example, when the base station 202 is implemented as part of a cellular communication system (such as one supporting 5G, LTE, or LTE-A), the interface 235 could allow the base station 202 to communicate with other base station s over a wired or wireless backhaul connection. When the base station 202 is implemented as an access point, the interface 235 could allow the base station 202 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of base station 202, various changes may be made to FIG. 2. For example, the base station 202 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the base station 202 could include multiple instances of each (such as one per RF transceiver). Also, various components in FIG. 2 could be combined, further subdivided, or omitted and additional components could be added according to particular needs.

Figure 3:
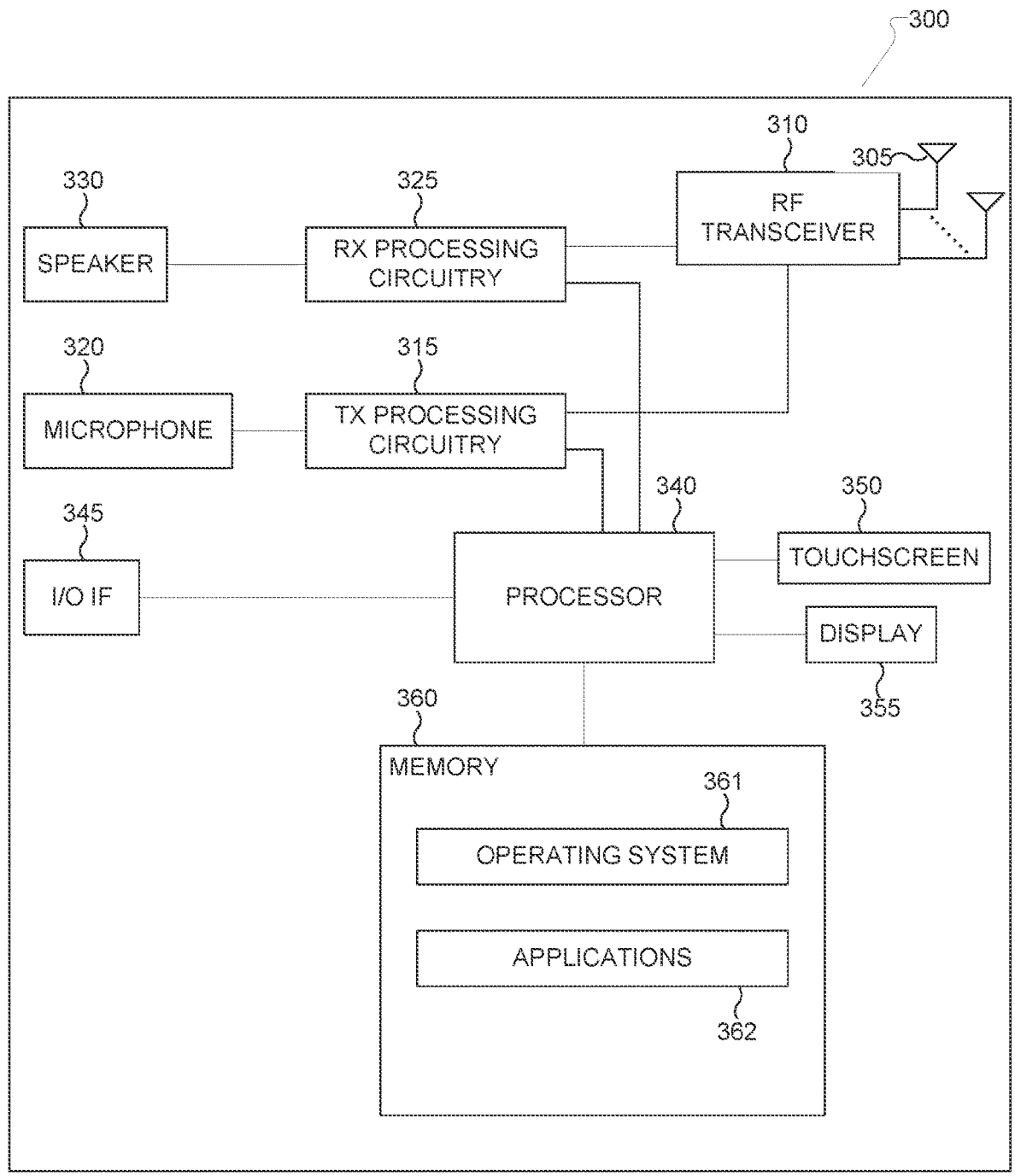
FIG. 3 illustrates an example of a user equipment (UE) in accordance with an embodiment of this disclosure.

FIG. 3 illustrates an example UE 300 according to this disclosure. The embodiment of the UE 300 illustrated in FIG. 3 is for illustration only, and the UEs 105a-105c of FIG. 1 could have the same or similar configuration. However, UEs come in a wide variety of configurations, and FIG. 3 does not limit the scope of this disclosure to any particular implementation of a UE.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a processor 340, an input/output (I/O) interface (IF) 345, a touchscreen 350, a display 355, and a memory 360. The memory 360 includes a basic operating system (OS) program 361 and one or more applications 362.

The RF transceiver 310 receives from the antenna 305, an incoming RF signal transmitted by a base station of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. According to certain embodiments, TX processing circuitry and RX processing circuitry encode and decode data and signaling for wireless in resource blocks ("RBs" or physical resource blocks "PRBs") which are transmitted and received by, inter alfa, the base station s of a wireless network (for example, wireless network 100 in FIG. 1). Put differently, TX processing circuitry 215 and RX processing circuitry 220 generate and receive RBs which contribute to a measured load at a base station. Additionally, RX processing circuitry 220 may be configured to measure values of one or more parameters of signals received at UE 300.

The processor 340 can include one or more processors or other processing devices and execute the basic OS program 361 stored in the memory 360 in order to control the overall operation of the UE 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from base stations or an operator. The processor 340 is also coupled to the I/O interface 345, which provides the UE 300 with the ability to connect to other devices such as laptop computers and handheld computers. The I/O interface 345 is the communication path between these accessories and the processor 340.

The processor 340 is also coupled to the touchscreen 350 and the display unit 355. The operator of the UE 300 can use the touchscreen 350 to enter data into the UE 300. The display 355 may be a liquid crystal display or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 300 configured as a mobile telephone or smartphone, UEs could be configured to operate as other types of mobile or stationary devices.

Figure 4:
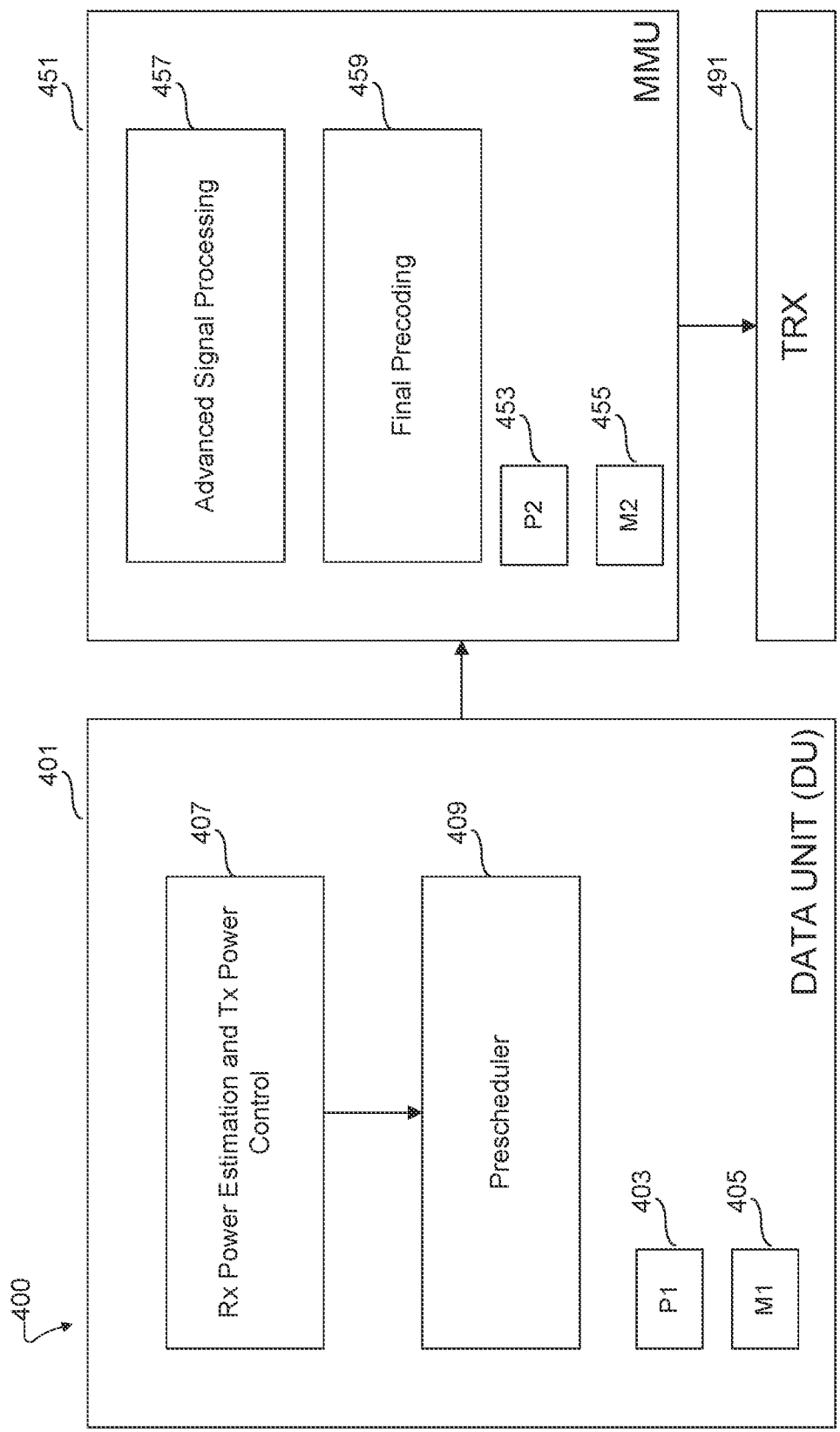
FIG. 4 illustrates an example of a split architecture for transmission processing circuitry of a base station or gNB according to various embodiments of this disclosure.

FIG. 4 illustrates an example of a split architecture 400 for transmission processing circuitry (for example, transmission processing circuitry 215) of a base station or gNB, according to various embodiments of this disclosure.

Referring to the non-limiting example of FIG. 4, multi-antenna transmitters facilitate the efficient use of transmission resources by enabling directional, amplified transmission of radio signals through beams formed by introducing slight phase differences in the signals transmitted by each antenna of a transmitter's antenna array. Further, the presence of multiple antennas also facilitates the transmission and reception of heavily multiplexed signals, wherein multiple users' data can be multiplexed and transmitted along a single beam or set of beams. With sufficient processing capacity to determine the power, phasing, and timing of the data (sometimes referred to as "prescheduling" and "precoding") to be transmitted by each antenna of the antenna array, system performance generally scales with the number of antennas. As such, advanced wireless network architectures (for example, 5G and beyond) contemplate that base stations and other network access points employ massive multiple-input, multiple-output ("massive MIMO") architectures, which use numerous antennas.

To perform prescheduling and precoding of signals to be transmitted across large numbers of antennas at the speeds required to provide high throughput to multiple users, certain base stations utilize a processing architecture which splits the computational processing load associated with precoding and prescheduling signals between two separate processing units.

According to various embodiments, split architecture 400 comprises a data unit 401 and a massive MIMO unit 451, which generate signals to be amplified and transmitted through the antenna array via radio frequency transceiver 491 (for example, RF transceiver 210a in FIG. 2).

Referring to the non-limiting example of FIG. 4, data unit 401 comprises a first processor 403 (for example, a CPU such as CPU 340 in FIG. 3) and a first, non-transitory memory 405, which contains instructions, that when executed by first processor 403, cause data unit 401 to implement a reception power estimation and transmission power control module 407 and a prescheduler 409. According to various embodiments, prescheduler 409 receives data to be transmitted to one or more user equipment (UE) (for example, user equipment 300 in FIG. 3), and assigns an initial determination of modulation and coding scheme (MCS), power level, and layer at which the data is to be encoded for transmission. According to certain embodiments, prescheduler 409 performs a determination of per-antenna transmission power based on a subset of the data used by MMU 451. For example, MMU 451 may perform precoding on all of the resource block groups (RBGs) of transmission frames across all of the sub-bands used by transceiver 491. However, given the division of processing labor between DU 401 and MMU 451 in split architecture 400, DU 401 may only have access to precoding information for a center sub-band of a radio frame. As such, in certain embodiments, prescheduler 409 sets certain transmission variables based on limited information, as certain additional information (for example, per-sub-band precoding weights) may only be available to, or is subsequently generated at, MMU 451.

In certain embodiments, in order to ensure that the received power from TRX 491 satisfies one or more specified constraints (for example, a local restriction on EMF radiation strength at a certain distance from a base station), DU 401 implements a received power and transmission power control module 407. In many instances, the constraints on received power are expressed as an average of the received power at a specified distance over a specified time.

For example, a received power constraint may be expressed according to Equation 1, below:

$$\frac{1}{T} \sum_{t=t_0}^{t_0+T} RxPwr < RegP \qquad \text{Equation 1}$$

Where RxPwr is the received power density of the transmitter, RegP is a specified (for example, by a regulation) power density limit and T is a specified measurement interval. Examples of real-world values for the above-specified variables include, without limitation, T=6 minutes and RegP=10 Watts/m².

In many systems, the DU has comparatively greater computational processing power than the MMU, and as such, performs a determination of the received power of the transmitter and sets power levels for antennas for prescheduler 409. Recognizing that: a.) a transmitter does not always use all of its available power, and that, with multi-antenna arrays, beams providing directional power gains may be achieved, one way of estimating the received power of the transmitter is as a function of the estimated effective power ($P_{eff}$) of the transmitter, where estimated $P_{eff}$ may be expressed as:

$$P_{eff,t} = \frac{P_T}{T} \sum_{t=1}^{T} \alpha_{PDSCH,t} G_{PDSCH,t} \qquad \text{Equation 2}$$

Where $P_{eff,t}$ is the estimated average effective power of the transmitter over an interval from t=1 to t=T, $\alpha_{PDSCH,t}$ is a ratio expressing how much of the available time-frequency resources in the physical downlink shared channel (PDSCH) are utilized at a given time t, and $G_{PDSCH,t}$ expresses the gain in a specified beam direction at a time t.

Thus, knowing the distance at which the received power RxPwr is to be measured for compliance with a received power constraint, RegP can be estimated based on $P_{eff}$, and an initial transmission power for each antenna complying with RegP can be set based on $P_{eff}$.

According to certain embodiments of this disclosure, received power estimation and transmission power control module 407 determines an estimated value of $P_{eff}$, which, in contrast to estimates generated according to Equation 2, compensates for downstream power adjustments performed by MMU 451.

Referring to the non-limiting example of FIG. 4, DU 401 passes the prescheduled signal for transmission to MMU 451, which comprises a second processor 453 (for example, controller/processor 225 in FIG. 2) and a second memory 455 (for example, memory 230 in FIG. 2), which contains instructions that, when executed by second processor 453, cause MMU 451 to perform advanced signal processing 457 and final precoding 459 of the prescheduled signal in preparation for transmission by transceiver 491.

According to various embodiments, advanced signal processing 457 may performing further adjustments to the prescheduled signal to account for problems specific to multi-antenna, multiplexed transmission, such as maintaining orthogonality between radio beams transmitted to different users, so as to minimize interference. Further, according to various embodiments, final precoding 459 comprises determining, at MMU 451 final precoding weights (for example, power and phase values) for each layer and resource block group of a multiplexed transmission by transceiver 491. According to certain embodiments, for non-broadcast transmissions, each device communicating with the base station through transceiver 491 is assigned a layer.

As part of final precoding 459, MMU 451 normalizes the maximum power of each antenna according to a per-antenna-power-constraint (PAPC) determined at the MMU, in order to ensure that the power amplifiers of transceiver 491 operate within the linear regions of their gain curves. Accordingly, the normalization of the maximum power according to the PAPC determined at the MMU can result in antenna power values determined at DU 401 being further reduced. In certain embodiments, PAPC is determined at the MMU according to Equation (3), below:

$$PAPC(t) = \max_{antennas_{idx}}$$
$$\left( \frac{\#TXRUs @ gNB}{\#Assigned\ RBGs(t)} \sum_{n_{rbg} \in Assigned\ RBGs(t)} \sum_{i_{Layer} \in all\ layers\ all\ UEs(t)} \right.$$
$$\left. |Precoder\ Weight\ (n_{rbg}, i_{Layer})|^2 \right)$$

Equation 3

As shown above, the PAPC for a given time t is a function of the full set of precoder weights (i.e., phase and power values) for all of the resource block groups (i.e., all of the sub-bands and frequencies used for transmission) and all of the layers of a multiplexed transmission. In certain embodiments, due to the division of computational labor between DU 401 and MMU 451, the final precoder weights for each resource group and layer of the transmission are determined at MMU 451, and are thus unavailable to DU 401. Accordingly, reception power estimation and transmission power control module 407 does not have the information necessary to fully calculate the value of PAPC(t) at DU 401. However, unless reception power estimation and transmission power control module 407 accounts for the further reduction of transmission power caused by normalization of individual antennas' transmission powers to comply with a PAPC value determined by MMU 451, there is a persistent risk that DU 401 will back off the transmission power of transceiver 491 more than is necessary to comply with a received power constraint.

To mitigate the risk of excessive roll-back of transmission power, certain embodiments according to the present disclosure cause a DU to compensate for the additional reduction in transmission power due to setting a PAPC constraint when estimating the receiving power of a transmitter and implementing DU-stage transmission power controls.

FIG. 5 illustrates operations of an example method 500 for performing PAPC compensation to reduce power backoff in a transmitter employing a split DU/MMU processing architecture (for example, split architecture 400 in FIG. 4). According to various embodiments, method 500 is performed at a data unit (for example, DU 401 in FIG. 4) which preschedules a signal, which is passed to an MMU (for example, MMU 451 in FIG. 4), to be transmitted through a multi-antenna transceiver (for example, a transceiver in a single-user Multi-Input/Multi-Output ("SU-MIMO") system or a multiple-user Multi-Input/Multi-Output ("MU-MIMO") system).

Referring to the non-limiting example of FIG. 5, at operation 505, the data unit (for example, DU 401 in FIG. 4) obtains the prescheduling data available to the DU for performing an estimate of the post-MMU radiated power of the transmitter. According to certain embodiments, the data obtained by the DU at operation comprises the pre-MMU coding weights from the sub-bands scheduled by the DU. According to some embodiments, the pre-MMU precoding weights are based on weights specified according to a precoding matrix index ("PMI"). In some embodiments, the PRE-MMU precoding weights are determined based on estimations based on measurements of sounding reference signals (SRS) received on an uplink channel. Additionally, in certain embodiments, the DU collects data indicating the utilization of the available physical resource blocks on the physical downlink shared channel (PDSCH) and physical downlink control channel (PDCCH).

According to some embodiments, at operation 510, the DU determines an estimated post-MMU value of the radiated power of the transmitter based on the information available to the DU and obtained at operation 505. Specifically, at operation 510, the DU may estimate the radiated power of the transmitter as a PAPC compensated value of $P_{eff}$, as given by Equation 4, below.

$$P_{eff,t} = \frac{\left(\frac{P_T}{PAPC(t)}\right)_T}{T} \sum_{t=1}^{T} \alpha_{PDSCH,t} G_{PDSCH,t}$$

Equation 4

As shown above, in Equation 4, the value of $P_{eff}$ is compensated for the value of PAPC(t) over the time interval. As discussed elsewhere in this disclosure, one of the underlying technical challenges addressed by certain embodiments as disclosed and claimed herein is that the DU does not have access to the full spectrum of coding weight and transmission power as the MMU, which makes estimating radiated power levels difficult and can lead to excessive rollback of power values at the DU.

In certain embodiments, at operation 510, the DU estimates PAPC by using precoding data for a center sub-band of the radio frame, for which the pre-MMU precoding weights are available at the DU as values for $P_T$ and α. In this way, the roll-off in transmission power associated with pre-scheduling at the DU can be reduced by a few (for example, 2-3) decibels, while still keeping the overall radiated power under a specified threshold. In other words, by more accurately estimating the radiated power at the DU, certain embodiments can apply a reduced power backoff at the DU, and achieve compliance with radiation requirements without unnecessarily sacrificing transmission power.

According to some embodiments, at operation 515, the DU determines, based on the estimated radiated power determined at operation 510, a power-backoff to be applied to signal, and passes the pre-scheduled signal to the MMU for further processing and pre-coding to determine the phase offsets and power values of all of the sub-bands of the transmission frame.

While embodiments have been described in which PAPC (t) is determined based on one simplification of Equation 2 focusing on PAPC(t) based on the center sub-band of the radio frame, other embodiments are possible and within the contemplated scope of this disclosure.

For example, in some embodiments, the value of PAPC(t) may be estimated at the DU based on pre-zero-forcing (ZF) precoding weights for the center sub-band, and summed across the number of sub-bands, as shown by Equation 5, below:

$$PAPC_1(t) = \max_{antennas_{idx}} \left( \#TXRUs @ gN * \sum_{i_{Layer} \in \#Layers} |pre - ZF \text{ Precoder Weight (center } RB, i_{Layer})|^2 \right)$$

Equation 5

As shown above, where PAPC(t) is determined based on Equation 5, the value of PAPC(t) is taken as the product of the maximum number of transmit antennas multiplied by the sum of the pre-ZF precoding weight of the center resource block (i.e., a resource block in the center sub-band of the radio frame) across the sum of transmission layers.

Additionally, and alternatively, the value of PAPC(t) may be estimated more conservatively by estimating PAPC(t) based on a minimum PAPC(t) value across all of the layers, thereby setting a floor value of PAPC(t) not necessarily present in the approach of Equation 5, above. According to certain embodiments, a value of PAPC(t) based on the minimum PAPC(t) across layers may be estimated according to Equation 6, below:

$$PAPC_2(t) = \#Layers * \min_{i_{Layer} \in \#Layers} \left( \max_{antennas_{idx}} \left( \#TXRUs @ gNB * (|pre - ZF \text{ Precoder Weight (center } RB, i_{Layer})|^2) \right) \right)$$

Equation 6

Additionally and alternatively, PAPC(t) can be estimated still more conservatively based on the maximum PAPC value across all of the layers, rather than a sum of PAPC values for all layers. As the number of layers increases (and by implication, the likelihood of a larger PAPC value in at least one layer), the estimated value of PAPC becomes increasingly conservative. According to some embodiments, PAPC(t) may be estimated based on the maximum PAPC per layer, according to Equation 7, below:

$$PAPC_3(t) = \max_{i_{Layer} \in \#Layers} \left( \max_{antennas_{idx}} \left( \#TXRUs @ gNB * (|pre - ZF \text{ Precoder Weight (center } RB, i_{Layer})|^2) \right) \right)$$

Equation 7

Additionally and alternatively, in some embodiments, a fixed value of PAPC may be used, which is then progressively and iteratively tuned in response to network conditions.

Figure 6B:
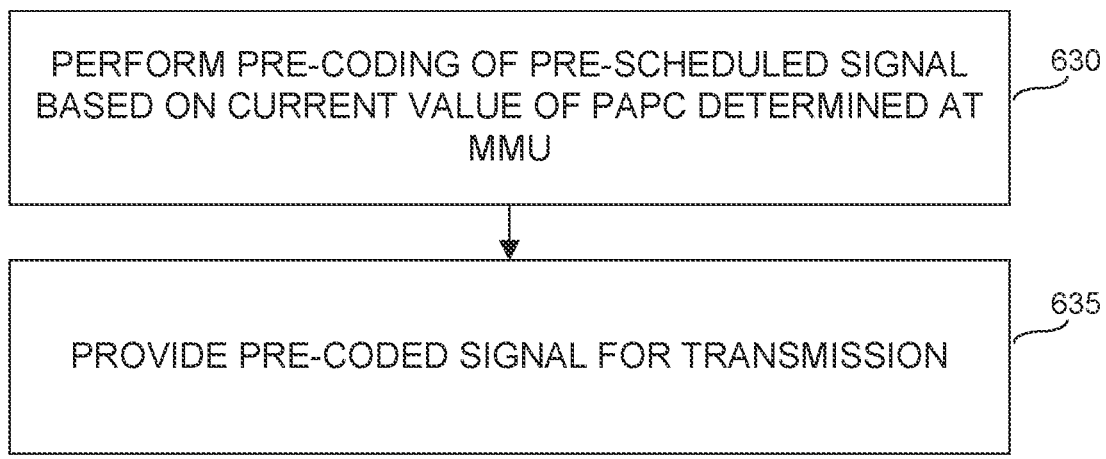

FIGS. 6A and 6B illustrate operations of an example method 600 for estimating the radiated power of a base station utilizing a per-antenna power constraint (PAPC), and rolling back the transmission power of the base station to comply with a power constraint without excessive roll-back due to failure to account for PAPC-related power adjustments. In this illustrative example, method 600 is performed at a base station with a split processing architecture (for example, split architecture 400 in FIG. 4) comprising a data unit (DU), massive MIMO unit (MMU) and a transceiver connected to a plurality of antennas.

Referring to the non-limiting example of FIG. 6A, at operation 605, the DU receives a signal to be transmitted through a multi-antenna array. In some embodiments, the signal to be transmitted is a multiplexed signal for a single user (for example, when the base station is operating in an SU-MIMO mode). In certain embodiments, the signal to be transmitted is a multiplexed signal for a plurality of users (for example, when the base station is operating in an MU-MIMO mode). Further, in the illustrative example of FIGS. 6A & 6B, the base station is understood to be subject to a radiated power constraint and along a radio beam formed by the transmitter. Accordingly, the DU and MMU are collectively responsible for prescheduling the data to physical resource blocks (PRBs) of radio frames transmitted by the base station, as well as setting the precoding values (i.e., power levels and phase offset values) for individual resource blocks.

According to various embodiments, at operation 610, the DU obtains pre-MMU per-antenna-power-constraint information. As noted elsewhere in this disclosure, one of the consequences of employing a split DU-MMU architecture is that much of the precoding is performed downstream of the DU, at the MMU, meaning that the DU does not have access to final precoding values obtained by performing zero-forcing and PAPC determinations at the MMU. According to certain embodiments, the data available to the DU at operation 610 comprises the pre-MMU coding weights from the sub-bands scheduled by the DU. According to some embodiments, the pre-MMU precoding weights are based on weights specified according to a precoding matrix index ("PMI"). In some embodiments, the PRE-MMU precoding weights are determined based on estimations based on measurements of sounding reference signals (SRS) received on an uplink channel. Additionally, in certain embodiments, the DU collects data indicating the utilization of the available physical resource blocks on the physical downlink shared channel (PDSCH) and physical downlink control channel (PDCCH).

According to certain embodiments, the PAPC constraint information obtained at operation 610 comprises a projected value of the further rollback in transmission power associated with the MMU. As discussed herein, in certain embodiments, the value of PAPC(t) is computed at the MMU, according to Equation 3. However, due to the split in the processing architecture between the DU and the MMU the values of certain parameters for calculating are determined by the MMU, and thus not available to the DU. Accordingly, in certain embodiments according to this disclosure, the DU obtains the PAPC constraint information based on a simplification of Equation 3 utilizing the data available to the DU.

In some embodiments, DU obtains the PAPC information based on pre-zero-forcing precoding weights with a common PAPC definition, such as described with reference to Equation 5. In various embodiments, such as described with reference to Equation 6, the DU obtains the PAPC information based on a minimum PAPC per layer value, wherein the minimum PAPC per layer value is based in part on a pre-zero-forcing precoding weight scaled by a number of scheduled coding layers. In some embodiments, such as described with reference to Equation 7, the DU obtains the PAPC information based on a maximum PAPC per layer value, and the maximum PAPC per layer is based in part on an unscaled pre-zero-forcing precoding weight.

As shown in the explanatory example of FIG. 6A, at operation 615, the DU determines a PAPC-compensated value of the estimated effective transmission power ($P_{eff}$). According to various embodiments, the DU adjusts an existing expression for calculating $P_{eff}$ to take into account the further diminution in transmission power due to PAPC normalization at the MMU. For example, in some embodiments, instead of estimating $P_{eff}$ according to Equation 2, herein, the DU determines a PAPC-compensated value of $P_{eff}$ according to Equation 4, herein.

According to various embodiments, at operation 620, the DU preschedules the data for transmission. In certain embodiments, operation 620 comprises assigning data to resource blocks according to the availability of RBs and the priority of the data. Operation 620 also further comprises determining transmission power values, wherein $P_{eff}$ satisfies a received power restriction.

Referring to the non-limiting example of FIG. 6A, at operation 625, the prescheduled signal is passed from the DU to the MMU, where further processing and precoding of the signal for transmission is taken up by one or more processors of the MMU. As shown in FIG. 6B, at operation 630, the MMU pre-codes the signal for transmission, determining phase offsets and power values for each resource block (RB) of the radio frame comprising the prescheduled signal. As part of precoding, the MMU also determines a per-antenna-power-constraint, which normalizes the antenna gain across each of the antennas of the multi-antenna array, such that all of the antennas are operating a linear portion of their gain curves.

As shown in FIG. 6B, at operation 635, the prescheduled, precoded signal is passed from the MMU to the transmission circuitry (i.e., power amplifiers and antennas) of the base station for transmission across the multiple antennas of the antenna array.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station comprising:
   a plurality of antennas;
   a data unit (DU) comprising a first processor and a first memory containing instructions, which when executed by the first processor, cause the DU to:
   receive a signal to be transmitted;
   obtain per-antenna-power-constraint (PAPC) information;
   determine an estimated effective transmission power ($P_{eff}$) based on the PAPC information; and
   pre-schedule the signal for transmission based on the $P_{eff}$; and
   a massive multiple-input multiple-output unit (MMU) comprising a second processor and a second memory containing instructions, which when executed by the second processor, cause the MMU to:
   receive, from the DU, the pre-scheduled signal;
   perform pre-coding on the pre-scheduled signal based on a current value of a PAPC determined at the MMU to normalize per-antenna gain of antennas of the plurality of antennas; and
   provide the pre-coded signal for transmission via the plurality of antennas.

2. The base station of claim 1, wherein the first memory contains instructions that, when executed by the first processor, cause the DU to obtain the PAPC information based on pre-zero-forcing precoding weights with a common PAPC definition.

3. The base station of claim 1, wherein:
   the first memory contains instructions that, when executed by the first processor, cause the DU to obtain the PAPC information based on a minimum PAPC per layer value, and
   the minimum PAPC per layer value is based in part on a pre-zero-forcing precoding weight scaled by a number of scheduled coding layers.

4. The base station of claim 1, wherein:
   the first memory contains instructions that, when executed by the first processor, cause the DU to obtain the PAPC information based on a maximum PAPC per layer value, and
   the maximum PAPC per layer is based in part on an unscaled pre-zero-forcing precoding weight.

5. The base station of claim 1, wherein the first memory contains instructions, which when executed by the first processor, cause the DU to preschedule the signal based on a received power density limit.

6. The base station of claim 1, wherein the first memory contains instructions that, when executed by the first processor, cause the DU to:
   obtain physical downlink shared channel (PDSCH) utilization information and total power information over a time interval T; and
   determine the $P_{eff}$ based on the PDSCH utilization information and total power information over the time interval T.

7. The base station of claim 6, wherein the $P_{eff}$ is determined based on:

$$P_{eff,t} = \frac{\left(\frac{P_T}{PAPC(t)}\right)}{T} \sum_{t=1}^{T} \alpha_{PDSCH,t} G_{PDSCH,t}$$

wherein $\alpha_{PDSCH,t}$ comprises a value of PDSCH utilization at a time t, $G_{PDSCH,t}$ comprises a value of antenna gain in a specified direction at the time t, PAPC(t) comprises a per-antenna power constraint at the time t, and PT comprises a value of a pre-MMU precoding weight for transmission power.

8. A method, comprising:
   at a base station comprising a plurality of antennas, a data unit (DU), and a massive multiple-input multiple-output unit (MMU),
   receiving, by the DU, a signal to be transmitted;
   obtaining, by the DU, per-antenna-power-constraint (PAPC) information;
   determining, by the DU, an estimated effective transmission power ($P_{eff}$) based on the PAPC information;
   pre-scheduling, by the DU, the signal for transmission based on the $P_{eff}$;
   receiving, by the MMU from the DU, the pre-scheduled signal;
   performing, by the MMU, pre-coding on the pre-scheduled signal based on a current value of a PAPC determined at the MMU to normalize per-antenna gain of antennas of the plurality of antennas; and providing, by the MMU, the pre-coded signal for transmission via the plurality of antennas.

9. The method of claim 8, further comprising:
obtaining, by the DU, the PAPC information based on pre-zero-forcing precoding weights with a common PAPC definition.

10. The method of claim 8, further comprising:
obtaining, by the DU, the PAPC information based on a minimum PAPC per layer value,
wherein the minimum PAPC per layer value is based in part on a pre-zero-forcing precoding weight scaled by a number of scheduled coding layers.

11. The method of claim 8, further comprising:
obtaining, by the DU, the PAPC information based on a maximum PAPC per layer value,
wherein the maximum PAPC per layer is based in part on an unscaled pre-zero-forcing precoding weight.

12. The method of claim 8, further comprising prescheduling, by the DU, the signal based on a received power density limit.

13. The method of claim 8, further comprising:
obtaining, by the DU, physical downlink shared channel (PDSCH) utilization information and total power information over a time interval T; and
determining, by the DU, the $P_{eff}$ based on the PDSCH utilization information and total power information over the time interval T.

14. The method of claim 13, wherein the $P_{eff}$ is determined based on:

$$P_{eff,t} = \frac{\left(\frac{P_T}{PAPC(t)}\right)}{T} \sum_{t=1}^{T} \alpha_{PDSCH,t} G_{PDSCH,t}$$

wherein $\alpha_{PDSCH,t}$ comprises a value of PDSCH utilization at a time $G_{PDSCH,t}$ comprises a value of antenna gain in a specified direction at the time t, PAPC(t) comprises a per-antenna power constraint at the time t, and PT comprises a value of a pre-MMU precoding weight for transmission power.

15. A non-transitory computer-readable medium containing instructions, which, when executed by a processor, cause a base station, which includes a plurality of antennas, a data unit (DU) and a massive multiple-input multiple-output unit (MMU), to:
receive, by the DU, a signal to be transmitted via the plurality of antennas;
obtain, by the DU, per-antenna-power-constraint (PAPC) information;
determine, by the DU, an estimated effective transmission power ($P_{eff}$) based on the PAPC information;
pre-schedule, by the DU, the signal for transmission based on the $P_{eff}$;
receive, by the MMU from the DU, the pre-scheduled signal;
perform, by the MMU, pre-coding on the pre-scheduled signal based on a current value of a PAPC determined at the MMU to normalize per-antenna gain of antennas of the plurality of antennas; and
provide, by the MMU, the pre-coded signal for transmission via the plurality of antennas.

16. The non-transitory computer-readable medium of claim 15, further containing instructions that, when executed by the processor, cause the DU to obtain the PAPC information based on pre-zero-forcing precoding weights with a common PAPC definition.

17. The non-transitory computer-readable medium of claim 15, further containing instructions that, when executed by the processor, cause the DU to obtain the PAPC information based on a minimum PAPC per layer value,
wherein the minimum PAPC per layer value is based in part on a pre-zero-forcing precoding weight scaled by a number of scheduled coding layers.

18. The non-transitory computer-readable medium of claim 15, further containing instructions that, when executed by the processor, cause the DU to obtain the PAPC information based on a maximum PAPC per layer value,
wherein the maximum PAPC per layer is based in part on an unscaled pre-zero-forcing precoding weight.

19. The non-transitory computer-readable medium of claim 15, further containing instructions, which when executed by the processor, cause the DU to preschedule the signal based on a received power density limit.

20. The non-transitory computer-readable medium of claim 15, further containing instructions that, when executed by the processor, cause the DU to:
obtain physical downlink shared channel (PDSCH) utilization information and total power information over a time interval T; and
determine the $P_{eff}$ based on the PDSCH utilization information and total power information over the time interval T.

* * * * *